(12) United States Patent
Hammonds

(10) Patent No.: US 7,258,181 B2
(45) Date of Patent: Aug. 21, 2007

(54) OMNI-DIRECTIONAL VEHICLE WITH TRAILER MULE HITCH ASSEMBLY FOR MOVING SEMI-TRAILERS

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 381 days.

(21) Appl. No.: 10/924,120

(22) Filed: Aug. 23, 2004

(65) Prior Publication Data

US 2006/0037787 A1    Feb. 23, 2006

(51) Int. Cl.
B62D 11/02    (2006.01)
(52) U.S. Cl. .................... 180/6.48; 280/433
(58) Field of Classification Search ........... 180/6.2, 180/6.48, 6.5; 280/433
See application file for complete search history.

(56) References Cited

U.S. PATENT DOCUMENTS

| | | |
|---|---|---|
| 1,467,456 A | 9/1923 | Silvius |
| 2,869,686 A | 1/1959 | Glanz |
| 3,763,945 A | 10/1973 | Danielson |
| 3,820,790 A | 6/1974 | Peterson |
| 3,938,608 A | 2/1976 | Folco-Zambelli |
| 4,077,647 A | 3/1978 | Nagayama |
| 4,111,273 A | 9/1978 | Blackburn et al. |
| 4,142,599 A | 3/1979 | Schmitt |
| 4,301,881 A | 11/1981 | Griffin |
| 4,306,329 A | 12/1981 | Yokoi |
| 4,324,301 A | 4/1982 | Everly |
| 4,638,445 A | 1/1987 | Mattaboni |
| 4,655,470 A | 4/1987 | Lin |
| 4,973,206 A | 11/1990 | Engle |
| 5,090,185 A | 2/1992 | Meeks |
| 5,139,102 A | 8/1992 | Pocapalia |
| 5,246,081 A | 9/1993 | Engle |
| 5,330,222 A | 7/1994 | Halverson et al. |
| 5,381,987 A | 1/1995 | Carns |
| 5,484,030 A | 1/1996 | Glenn |
| 5,516,169 A | 5/1996 | Falk et al. |
| 5,623,818 A | 4/1997 | Ledbetter |
| 5,704,201 A | 1/1998 | Van Vleet |
| 6,095,268 A | 8/2000 | Jones, Jr. |

(Continued)

Primary Examiner—Tony Winner
(74) Attorney, Agent, or Firm—Gary L. Bush; Andrews Kurth LLP

(57) ABSTRACT

An omni direction vehicle (ODV) with a frame having a round surface about its perimeter rotatably coupled to a trailer mule hitch assembly having an axle, wheels and a fifth wheel plate located generally above the axle. Two independent drive wheels located on an axis through the center of the ODV frame are mounted at the same distance from a central vertical axis through the frame. Each wheel is powered independently of the other and can rotate at variable speeds in either direction. The ODV is capable of movement in any direction by rotating the axis of the drive wheels to a position which is perpendicular to the desired direction of travel. The ODV can spin about its vertical axis such that the axis of the drive wheels can be oriented at any direction without changing the original footprint of the space that the frame occupies over the ground. Thus, the combined ODV/trailer mule hitch assembly can rotate about the center of the fifth wheel plate. The fifth wheel plate is mounted on an articulated arm which raises and lowers the fifth wheel plate for rapid coupling to and transportation of a semi-trailer without the need for retracting the semi-trailer's landing gear.

15 Claims, 6 Drawing Sheets

U.S. PATENT DOCUMENTS

| | | |
|---|---|---|
| 6,112,838 A | 9/2000 | Klein et al. |
| 6,250,663 B1 | 6/2001 | Maloy |
| 6,408,970 B1 | 6/2002 | Eng |
| 6,581,703 B2 * | 6/2003 | Hammonds ................. 180/6.2 |
| 6,830,114 B2 * | 12/2004 | Hammonds ................. 180/6.2 |
| 7,040,425 B2 * | 5/2006 | Hammonds ................. 180/6.48 |

* cited by examiner

OMNI-DIRECTIONAL VEHICLE WITH TRAILER MULE HITCH ASSEMBLY FOR MOVING SEMI-TRAILERS

BACKGROUND OF THE INVENTION

1. Field of the Invention

This invention relates generally to a wheeled vehicle designed to turn about a central vertical axis. In particular, the invention relates to powered utility riding vehicles of the type useful for moving trailers about a trailer terminal, truck yard, or warehouse where rotation-in-place steering is advantageous.

2. Description of Prior Art

Within the transportation industry, semi-trailers are often routed through trailer distribution terminals or trailer yards. Space is normally at a premium resulting in limited maneuvering space within the yards. The trailers must often be shuttled about the yards and are typically moved using terminal tractors. Conventional terminal tractors, also known as trailer jockies or yard mules, typically resemble shortened road tractors. They are configured with two axles, one in front, the other in the rear. The rear axle is fixed to the frame of the vehicle and provides motive force via a pair of dual wheels. The front axle provides for vehicle steering via two steerable wheels which simultaneously pivot with a limited angular range.

A semi-trailer is pivotably coupled by a standard fifth wheel plate hitch located above the rear axle. Since there is a fixed distance between the fixed rear drive axle and the front steerable axle, a turning radius is required that far exceeds the space actually occupied by the vehicle itself. The longer the distance between front and rear axles, the larger the turning radius that is required to change directions of the vehicle. A large turning radius makes maneuvering around tight areas difficult and often dangerous. In a terminal where semi-trailers are frequently moved and space is constrained, a tractor with a small turn radius is advantageous. Because of their smaller lengths and turn radii, specialized terminal tractors are generally preferable to retired road tractors for use within terminals.

In a truck yard, an operator must often move in reverse to maneuver in tight spaces. Operators are required to look over their shoulders in order to back up. In a congested location, hazards from reversing are increased. Even with shortened terminal tractors, it is often difficult, even for a skilled operator, to park a semi-trailer against a wall in a slot or stall between two other trailers. In some instances, a backing maneuver cannot be accomplished without uncoupling the trailer, moving the tractor to a more favorable angle, and re-coupling the trailer to complete the move. In other instances, it may be necessary to jockey the trailer back and forth many times in order to back the trailer into a given stall.

It is also time consuming to back a conventional terminal tractor fifth wheel plate into engagement with the king pin of the trailer even with the V-shaped slot and the double-oscillation mount common with fifth wheel plates. Precision maneuvering is required while the driver must look backward resulting in operator fatigue and inefficiency. The driver must also exit the tractor cab in order to connect the air hoses and electrical cable to the trailer. The hitching operation is further complicated in the instances where a pintle hook/gudgeon hitch is used in place of the fifth wheel plate/king pin hitch.

In a truck yard where trailers are routinely coupled, moved, and then uncoupled, any increase in coupling efficiency, maneuvering efficiency, and safety amount to a significant cost savings. It is desirable, therefore, to have a vehicle with greater maneuverability and the ability to simplify the hitching process to enhance the safety of the operator and of the surroundings.

Prior art vehicles are known for turning with a zero turning radius, or so called "turning on the spot." U.S. Pat. No. 3,938,608 describes a vehicle with a single center-mounted pivoting drive motor that is rotated about a vertical axis in order to change directions of the vehicle. The '608 vehicle is supported with three or more swivel wheels located at equal radial distances from the center wheel. The '608 outer profile is in the shape of a rectangle and has appendages that make close proximity maneuvering impossible next to another object such as a nearby trailer. Furthermore, the '608 vehicle lacks tractive force because of the single drive wheel. A single drive wheel must be rotated in order to change the vehicle direction, and although the single drive wheel can be turned to direct the vehicle in any direction, it does not provide directional stability for the case where a force is exerted on the vehicle from an angle to the line of intended travel. For example, a force against the '608 vehicle at a 20 degree angle to the right or left of the line of travel would force the single '608 wheel to skid, causing loss of directional control.

More recently, U.S. Pat. No. 6,581,703 describes an omni-directional vehicle which is round and which has a trolley adapted to rotatably mate with the vehicle and support a tow-bar. The '703 vehicle overcomes many limitations of the '608 vehicle, but the '703 vehicle is not adapted to couple to and support the weight of a loaded semi-trailer.

3. Identification of Objects of the Invention

A primary object of this invention is to provide a service vehicle which is designed and arranged for moving semi-trailers with enhanced maneuverability.

Another object of the invention is to provide a service vehicle that can turn on the spot and be of the smallest physical size relative to the space it occupies.

Another object of the invention is to provide a service vehicle which reduces the risk of accidents which may result in damage or injury to equipment or operating personnel.

Another object of the invention is to provide a service vehicle having an outer perimeter that defines an outer imaginary cylinder that encloses any equipment or appendages rigidly mounted on the vehicle thereby enhancing its capability to maneuver the vehicle without impacting objects external to the vehicle.

Another object of the invention is to provide a vehicle which expedites the process of hitching a trailer by allowing the driver to face the hitch assembly and trailer while positioning the vehicle to the trailer for coupling.

Another object of the invention is to provide a vehicle for moving semi-trailers from one location to another location which obviates the need for the operator to drive in a reverse direction.

Another object of the invention is to provide a vehicle that can push a trailer while providing an unobstructed view under the trailer for the driver to promote safe and efficient docking of the trailer.

Another object of the invention is to increase the operating efficiency of a semi-trailer terminal or truck yard by allowing a driver to connect and disconnect the primary and brake air hoses and electrical cable (pigtail) without having to dismount the tractor.

SUMMARY OF THE INVENTION

The objects identified above along with other features and advantages of the invention are incorporated in an omni-directional vehicle rotatably coupled to a trailer mule hitch assembly. The omni-directional vehicle (ODV) provides unique maneuverability and efficiency due to a combination of its characteristics including its shape and the configuration of its drive wheels. When the ODV is combined with a radially movable trailer mule hitch assembly to its circular frame, such combination provides for free circumferential attachment to semi-trailers for handling with minimal space required for maneuverability and safety of operation.

The ODV includes a frame with a perfectly round outer ring and rail assembly about its perimeter having no fixed external appendages. The ring has a perfect, unobstructed smooth circular surface defined by a central vertical axis of the ODV and a constant radius about the axis. The ODV has two independent drive wheels located on a horizontal axis which intersects the vertical axis. Each wheel is at exactly the same distance from the vertical axis, with each wheel having the capability to move independently and at infinitely variable speeds in forward and reverse directions. Thus, the ODV can move in any direction by rotating the axis of the drive wheels perpendicular to the desired direction of travel. By applying motive force to the wheels in the appropriate direction and speed, the ODV can turn and move in any direction perpendicular to the axis of the drive wheels within the area covered by its circumference. The ODV can rotate about the vertical axis to any radial heading without changing its original footprint. Accordingly, the ODV requires a true zero turning or maneuvering radius, and thus requires only the space that it occupies in which to maneuver in any direction. The ODV requires no maneuvering space outside its footprint. The size of the ODV is generally smaller than that of a conventional vehicle with a drive axle and a steering axle.

The ODV has upper and lower rails on the round outer ring which support a trolley. The trolley includes a plurality of cams, precision wheels or rollers that are rotatably coupled to the upper and lower rails of the outer ring so that the trolley can move freely around the entire circumference of the outer ring of the ODV. The trolley is the point of attachment for a trailer mule hitch assembly which is designed and arranged to couple to a semi-trailer and support its tongue weight.

The trailer mule hitch assembly, coupled to the trolley, includes wheels which contact the ground. A fifth wheel plate is included for coupling to a semi-trailer having a king pin. Alternatively or additionally, the trailer mule hitch assembly may have a pintle hook assembly for coupling to a trailer having a drawbar and gudgeon. The trailer mule hitch assembly wheel axle is preferably mounted directly to the trailer mule hitch assembly frame and supports the tongue weight of an attached semi-trailer.

When an attached semi-trailer needs to be backed into a stall, the operator of the ODV with the rotatably attached trailer mule hitch assembly (hereinafter simply referred to as the trailer mule vehicle) rotates the frame to a desired position while pushing the trailer. The motion is similar to backing up a conventional vehicle with a towed trailer except that with the trailer mule vehicle, the operator faces in the direction of motion. When a trailer needs to be towed, the trailer mule vehicle rotates the frame to face in the desired direction of travel and the trailer is pulled in a conventional fashion. The wheels mounted to the hitch assembly provide stability for the ODV when positioned at various locations about the circumference of the ODV.

The ODV can move omni-directionally about a given point, change directions with zero maneuvering room beyond the physical footprint of the vehicle, and push or tow trailers with precise control. Such capabilities reduce the operating space on the ground required to move or handle a trailer being manipulated, thus increasing operating efficiency. Safety is increased because the operator of the ODV, positioned directly at the center of the ODV, can always be facing the direction the vehicle is moving, never having to back up and look backward.

BRIEF DESCRIPTION OF THE DRAWINGS

The invention is described below with reference to preferred embodiments which are illustrated by the attached drawings, of which.

DESCRIPTION OF THE PREFERRED EMBODIMENTS OF THE INVENTION

Figure 1:
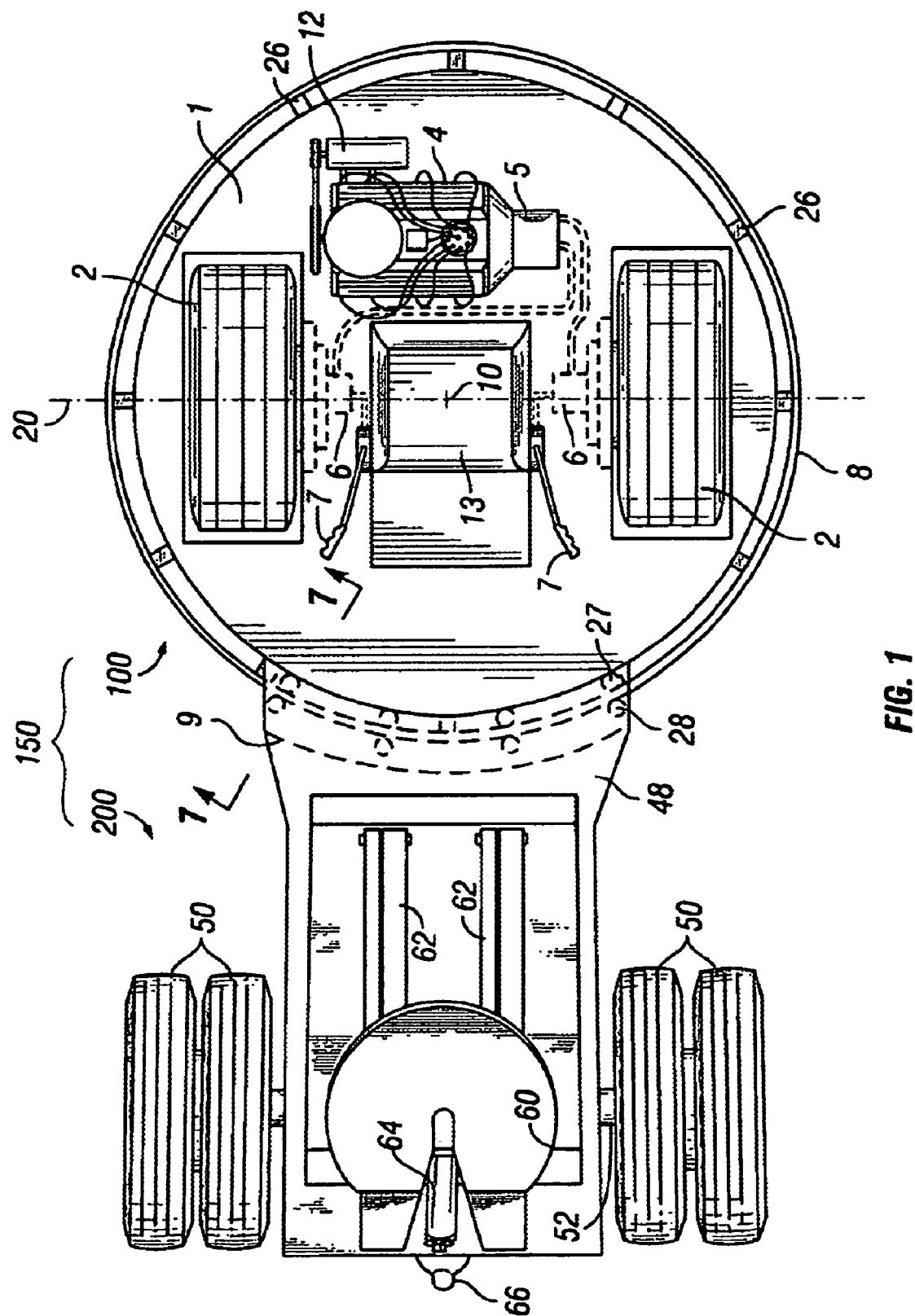
FIG. 1 is a top view of the trailer mule vehicle according to the invention with the cab removed from the ODV to show the major drive components, a circular rail about the frame of the ODV, and a trolley with a trailer mule hitch assembly rotatably mounted on the rail, the ODV oriented with respect to the trailer mule hitch assembly in a manner to facilitate coupling to a semi-trailer or for backing an attached semi-trailer.

As shown in FIG. 1, the trailer mule vehicle 150 according to the invention comprises an omni-directional vehicle (ODV) 100 rotatably coupled to a trailer mule hitch assembly 200. ODVs are known in prior art from U.S. Pat. No. 6,581,703, issued to Hammonds (Jun. 24, 2003), which is incorporated herein in its entirety by reference. The ODV 100 includes primary wheels 2 mounted on a frame 1 which has an outer perimeter in the shape of a circle. The circular frame has a central vertical axis 10 which is perpendicular to the plane of the top view of FIG. 1. The wheels 2 are mounted along a horizontal axis 20 which intersects the vertical axis 10 as shown in FIG. 1.

A power source 4 mounted on the frame 1 is provided for driving a hydraulic pump 5 and air compressor 12. The power source 4 may be a diesel or gasoline engine or an electric motor/battery assembly. The pump 5 provides balanced pressurized hydraulic fluid to separate hydraulic motor 6 gearbox assemblies, one for each wheel 2. The speed and direction of rotation of motors 6 and wheels 2 is controlled by control levers 7 which operate hydraulic control valves (not illustrated) coupled to hydraulic motors 6. The control levers 7 and valves operate exactly the same for each of the left and right wheels 2. Each lever 7 and valve has a neutral position, such that when a lever is at such neutral position, a wheel associated with that lever is hydraulically braked. If a lever 7 is moved forward, the corresponding wheel motor 6 moves forward for turning a respective wheel 2. If a lever 7 is moved backward, the corresponding wheel motor 6 moves backward for turning a respective wheel 2. The greater distance that a lever 7 is pushed or pulled from its neutral position, the faster the wheel motor 6 turns, thereby causing the wheel 2 to which it is coupled to increase in speed. A seat 13 for the operator is mounted on frame 1 with the vertical axis 10 passing through it.

If both levers 7 are moved in the same direction and amount at the same time, both drive wheels 2 move at the same speed, thereby causing straight-ahead movement of the ODV over the ground, perpendicular to the horizontal axis 20. If the levers 7 are pushed forward or backward at an unequal distance from each other, the lever moved the greater distance will produce a greater speed of rotation at its corresponding wheel causing the vehicle to turn toward the wheel that is turning slower. For example, if the right control lever 7 is pushed farther forward than is the left lever 7, the ODV 100 turns to the left, and vice versa.

If the right lever 7 is moved forward and the left lever 7 is moved backward and both lever positions are the same in amount and opposite in direction, the left wheel turns backward and the right wheel turns forward, both at the same rate of rotation. In this instance, the ODV 100 turns in its own space or footprint while its footprint remains stationary over ground, i.e., the ODV revolves about the vertical axis 10. (The footprint over the ground is the area of the ground beneath the circular frame 1.) The counter-clockwise rotation described above becomes a clockwise rotation when the right wheel 2 rotates backward at the same rate as the forward rotation of the left wheel 2. Thus, the ODV 100 can change its heading while not moving or varying its footprint over the ground during such a change of heading. If the ODV does not interfere with any object on the ground at one heading, it will not interfere with any object at any heading because the ODV footprint does not change during rotation.

A circular trolley rail or ring 8 is mounted to the frame 1 with a plurality of mounting plates or stanchions 26 or by other suitable means. The trolley rail 8 provides a smooth running surface for a trolley assembly 9. Trolley 9 has a plurality of cams or rollers 27 located inboard of the rail 8 and cams or rollers 28 located outboard of the rail 8 which rotatably capture rail 8 with substantially no looseness. The trolley is the point of attachment for the hitch assembly 200. The trolley assembly 9 is arranged and designed to freely rotate about rail 8.

Figure 3:
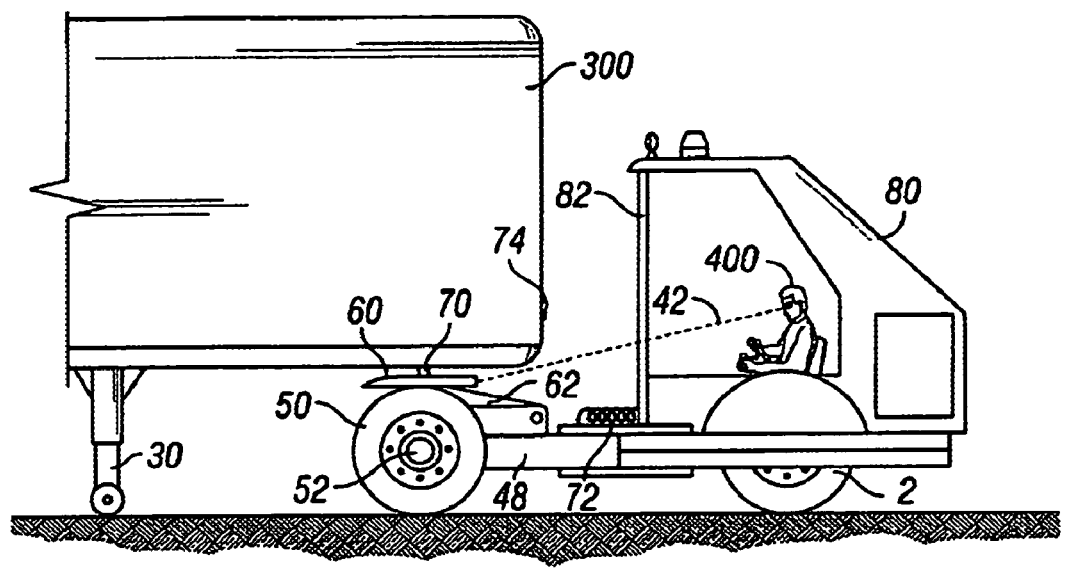
FIG. 3 is side view of the trailer mule vehicle according to the invention oriented as shown in FIG. 1 with the ODV oriented with respect to the trailer mule hitch assembly so that the driver faces the hitch assembly for coupling the fifth wheel plate to a trailer king pin.
Figure 5:
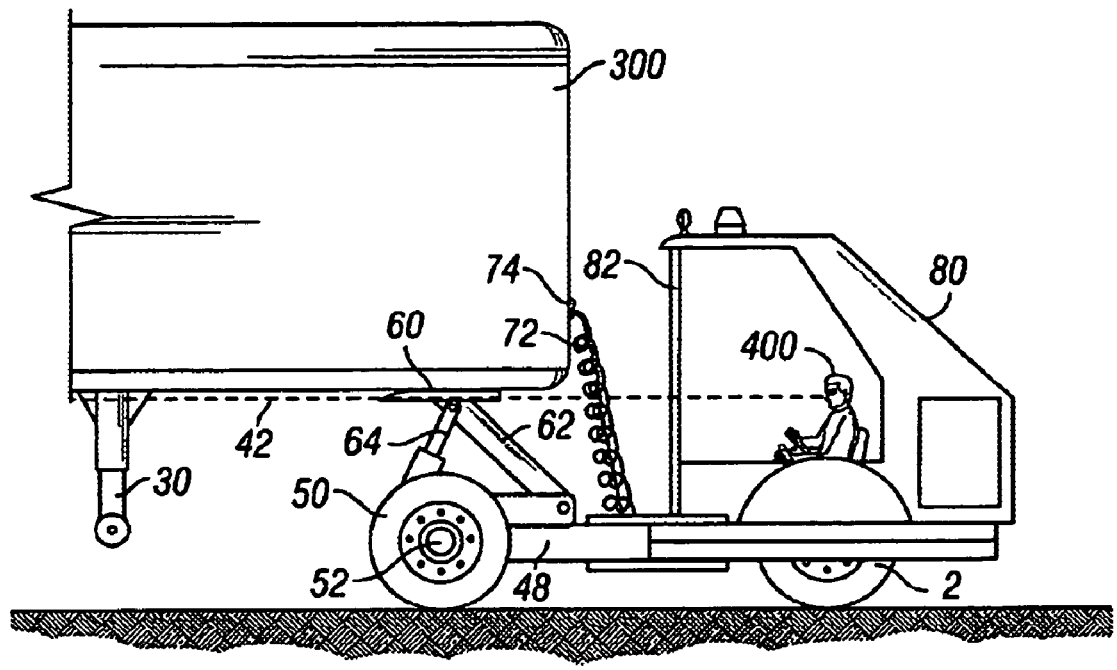
FIG. 5 is a side view of the trailer mule vehicle according to the invention with the ODV oriented so that the driver faces the attached trailer for backing the trailer and the driver has a clear line of sight in direction of travel underneath the trailer.

The trailer mule hitch assembly 200 is coupled to the trolley assembly 9. It includes a frame 48, a pair of dual wheels 50 on an axle 52, and a fifth wheel plate 60 supported by articulated arms 62. The arms 62 are pivotably connected to the frame 48 of the hitch assembly and are cross-braced for unitary movement. The fifth wheel plate 60 can be raised and lowered by one or more hydraulic cylinders or other actuators 64 pivotably connected between the hitch assembly frame 48 and the arms 62. Variable height fifth wheel plates are well known in the art, as exemplified in U.S. Pat. No. 4,111,273 issued to Blackburn et al. (Sep. 5, 1978) and U.S. Pat. No. 5,330,222 issued to Halverson et al. (Jul. 19, 1994), both incorporated herein by reference. In its lowest position, the fifth wheel plate 60 is sufficiently disposed below the standard 48 inch coupling height to mount a trailer 300 with a landing gear 30 which is not fully extended or which has partially sunk into the ground (FIG. 3). The fifth wheel plate 60 can be elevated by the articulating arms 62 to a sufficient height to allow movement of a trailer 300 with sufficient clearance between the ground and the fully-extended landing gear 30 and to allow the trailer mule driver 400 an unobstructed view underneath the trailer 300 (FIG. 5). Because the fifth wheel plate must rise to carry the trailer load, a conventional cushioned axle suspension is not desirable; a cushioned suspension increases the distance the fifth wheel plate must travel in order to raise the trailer. Thus, axle 52 preferably employs a solid mount directly to the trailer mule hitch assembly frame 48. Alternatively, the trailer mule hitch assembly 200 may have a pintle hook assembly 66 (FIG. 1) attached to the back end of the trailer mule hitch frame 48 for coupling to a trailer having a drawbar and gudgeon with the pintle hook assembly 66 being either in addition to or in place of the fifth wheel plate.

The trailer mule hitch assembly 200 and an attached trailer 300 generally require power and control, in one form or another, from the ODV 100. For instance, the fifth wheel plate actuator 64 may be hydraulically, pneumatically, or electrically operated, but the power and control preferably originate from ODV 100. The wheels 50 of hitch assembly 200 may optionally have brakes (not shown) for added safety. Such brakes are preferably controlled by the operator while seated in seat 13. Brake control may be integrated with levers 7. The brakes are preferably hydraulic or pneumatic. Further, the trailer mule wheels 50 may be designed to have freewheel capability only, or they may optionally incorporate a power drive mechanism (not shown) to facilitate moving heavily loaded trailers. Such a drive mechanism is preferably mounted on frame 48 of the hitch assembly 200. Alternatively, hydraulic motors mounted on frame 48 can be powered by pump 5 via a rotatable coupling which allows the ODV 100 to freely swivel with respect to the hitch assembly 200. The trailer mule hitch assembly may also require brake lights and turn signals (not shown), particularly if the trailer mule vehicle will be subjected to us in public roadways. Lastly, semi-trailers generally require pneumatic and electric power in order to function.

Preferably, pneumatic, electric and/or hydraulic power and control lines are provided from the ODV 100 to the revolvable truck mule hitch assembly 200 (and trailer 300) via one or more swivel fittings (not shown) disposed along vertical axis 10. Alternatively, pneumatic, hydraulic or electric power and/or control may be provided from the ODV to the hitch assembly 200 via long extensible or resilient coiled hoses and/or cables. Using hoses and cables to bridge the ODV/hitch assembly interface provides for a simple design, but limits the number of revolutions the ODV 100 can turn in a single direction with respect to the trailer mule hitch assembly 200 without unwinding by rotating in the opposite direction. Other arrangements may be used, such as attaching a pressurized air tank to the trailer mule hitch frame thus eliminating the need for an air compressor. Power transmitted to the trailer mule hitch assembly 200 from ODV 100 can be readily converted from one form to another, and control can exist in wireless electronic form. The design and arrangement of power transmission and control across movable boundaries is well known in the art and needs no further discussion to one of skill in the art.

Figure 2:
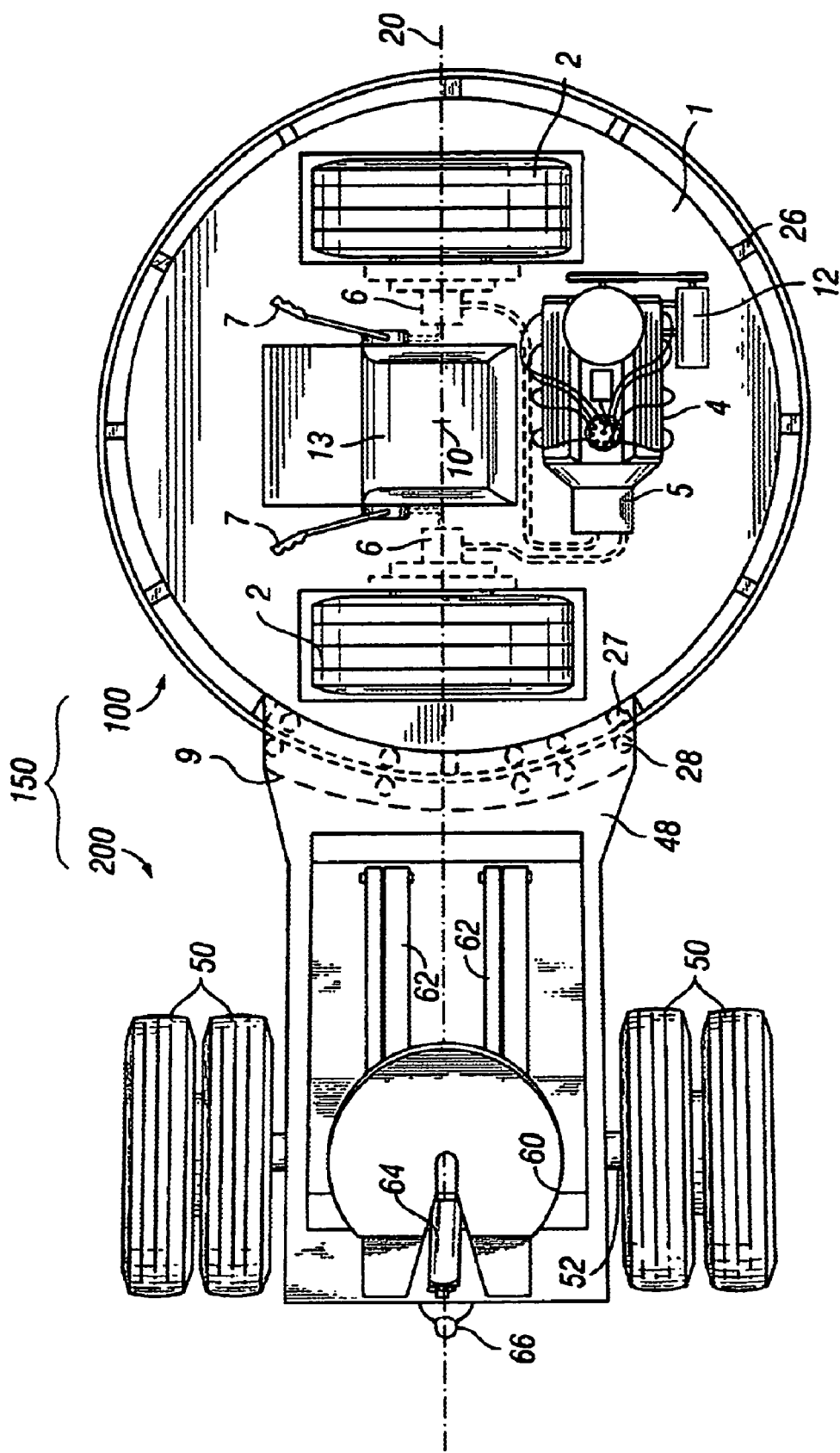
FIG. 2 is a top view of the trailer mule vehicle of FIG. 1, but with the ODV oriented to provide a zero turn radius about its vertical central axis while the ODV is coupled to a stationary trailer mule hitch assembly.

FIG. 2 shows the trailer mule vehicle 150 according to the invention oriented with ODV horizontal axis 20 passing through the center of the fifth wheel plate 60. The driver of the vehicle in FIG. 1 needs only to push the left lever 7 forward while simultaneously pulling the right lever 7 backward an equal distance in order to rotate ODV 100 clockwise ninety degrees to arrive at the orientation shown in FIG. 2. During this operation, hitch assembly wheels 50 do not move. In the orientation shown in FIG. 2, the trailer mule vehicle 150 has a zero turn radius about the center of the fifth wheel plate (and the king pin of a coupled trailer). By pushing both right and left levers 7 forward, the right lever slightly more forward than the left lever, the trailer mule vehicle 150 can be made to pivot about the center of the fifth wheel plate for repositioning the hitch assembly 200 relative to an attached trailer without moving the trailer. Thus, unlike the terminal tractors of prior art, it is never necessary to uncouple and re-couple the trailer to maneuver the trailer into a tight space. Once the trailer mule vehicle 150 according to the invention has been rotated about the trailer king pin to arrive at an optimal angle, the ODV 100 is rotated in place again so that the driver generally faces the trailer, and the parking maneuver is completed.

FIG. 3 is a side view of the trailer mule vehicle 150 according to the invention. Preferably, the ODV 100 is covered by a cab 80 to shelter the operator from the elements. The cab front 82 is designed and arranged to allow the operator a clear view, and may also serve as the point of entry and exit for the ODV 100.

Figure 4:
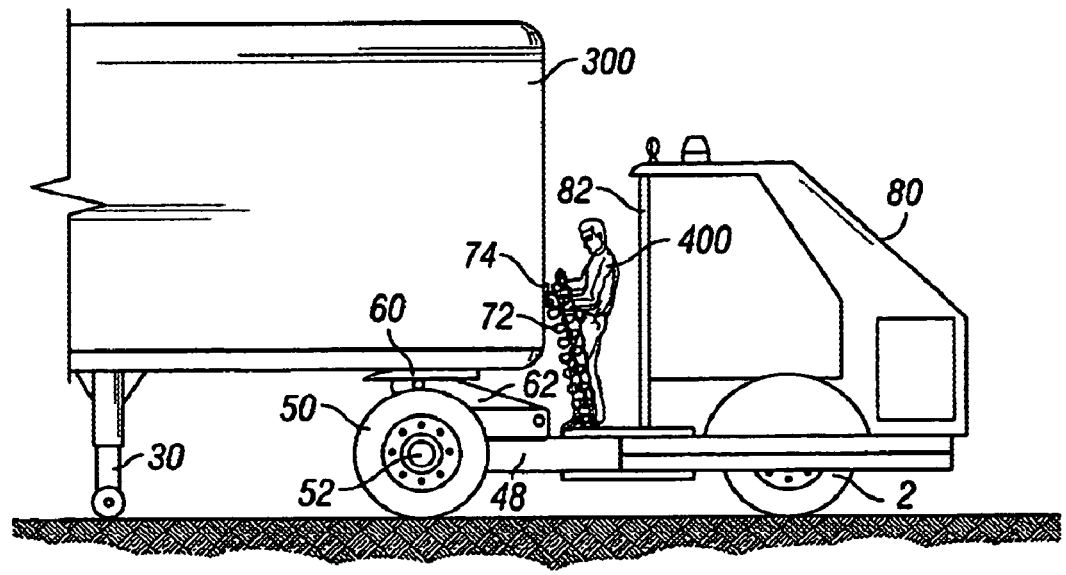
FIG. 4 is a side view of the trailer mule vehicle according to the invention illustrating how an operator can connect air hoses and electrical cables to a semi-trailer without being required to dismount from the vehicle.
Figure 6:
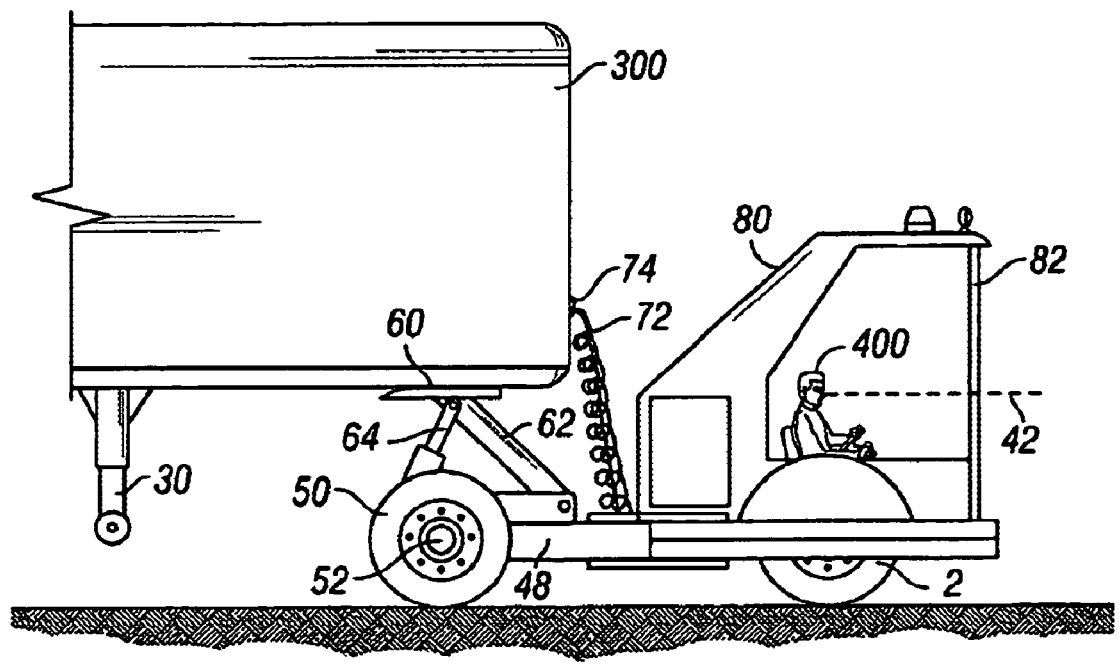
FIG. 6 is a side view of the trailer mule vehicle according to the invention with the ODV oriented so that the driver faces forward for ordinary towing of the trailer.

A typical sequence of moving a landed semi-trailer in a truck yard is shown in FIGS. 3-6. First, as shown in FIG. 3, the trailer mule vehicle 150 is in the process of hitching to a trailer 300. The driver 400 has a clear line of sight 42 to the fifth wheel plate 60 without having to look over his shoulder as required in conventional terminal tractors. The fifth wheel plate 60 is lowered sufficiently below the king pin 70 of trailer 300 to facilitate the coupling process. Once the king pin 70 is properly aligned with the fifth wheel plate, the actuating arms 62 may be raised to complete the hitching process as shown in FIG. 4. Also illustrated in FIG. 4, the driver 400 connects the air hoses and electrical pigtail cable 72 to the trailer 300 without dismounting the trailer mule vehicle 150. The ODV cab 80 is preferably open in front or has a windscreen or other arrangement which allows the driver to easily take a step or two forward to be within reach of the quick connect couplers 74 on trailer 300 to quickly couple air and electricity. Referring now to FIG. 5, the driver 400 raises the hitched semi-trailer 300 off of its fully extended landing gear 30 by actuating cylinder 64 which raises articulated arms 62 and fifth wheel plate 60. The driver 400 does not need to dismount the trailer mule vehicle 150 in order to manually raise the landing gear 30, thus speeding the trailer-moving process. The driver 400 may back the trailer while facing forward, and because the driver sits low in the trailer mule vehicle 150, the driver 400 has a clear line of sight 42 under the trailer 300 in the direction of travel. This feature allows the operator 400 to see a dock or the like at the rear of trailer 300 thereby enhancing safety and docking speed. Referring to FIG. 6, once the driver desires to tow the trailer, the ODV 100 is simply rotated in place to face away from the trailer 300. Conventional towing is now possible.

Figure 7A:
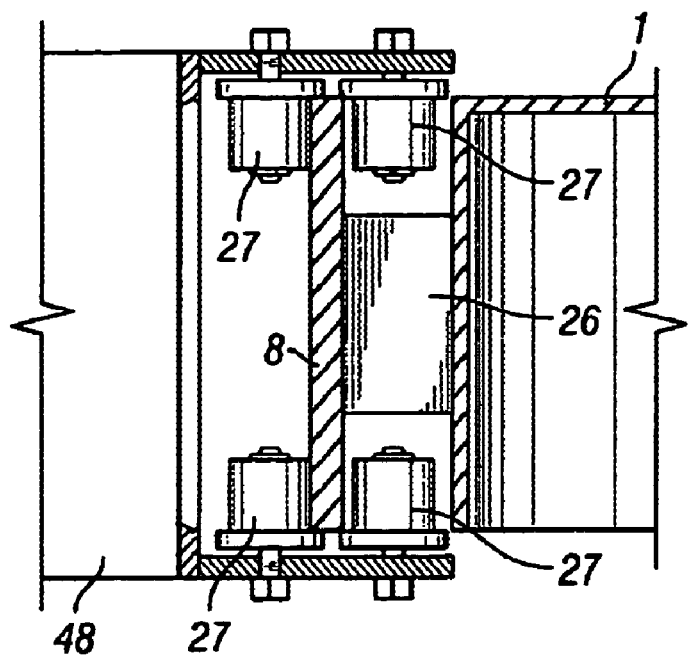
FIGS. 7A and 7B are respectively a side section view and a top view of the trailer mule hitch assembly mounted on the trolley illustrating the rotatable mounting of the trolley on the circular rail of the ODV.
Figure 7B:
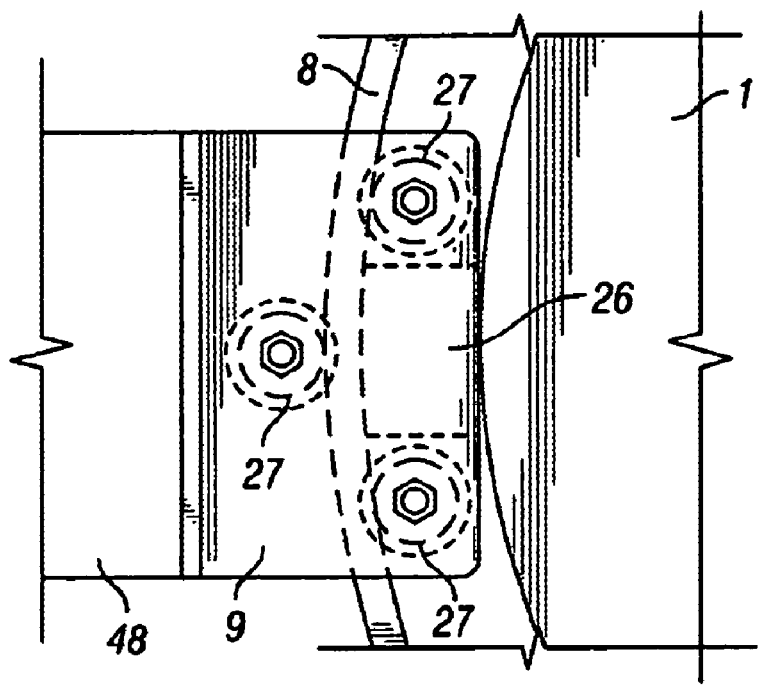

FIGS. 7A and 7B illustrate the ODV/trailer mule hitch assembly interface. The circular trolley rail or ring 8 is mounted to the frame 1 with a plurality of mounting stanchions 26 spaced around the circumference of the vehicle or by other suitable means. The trolley rail 8 provides a smooth running surface for the trolley assembly 9. Trolley 9 has a plurality of cams or rollers 27 inboard of the rail 8 and cams or rollers 27 outboard of the rail 8. Both the inboard and outboard cams or rollers are located both above and below stanchions 26, usually in sets. In other words, the cams are preferably positioned with a number of upper and lower cam or roller pairs set inboard of the rail 8 and an equal number of upper and lower cam or roller pairs set outboard of the rail 8. The cams or rollers 27 rotatably capture rail 8 with substantially no looseness. The mounting positions of the inboard cams or rollers 27 and the outboard cams or rollers 27 match the curvature of the rail 8, thus allowing the trolley 9 to rotate smoothly with minimal friction and resistance about rail 8. The number and size of cams may vary depending on load being applied. The cams or rollers 27 bear loads in both the horizontal and vertical directions and thus may be equipped with bearings to provide smooth rotation of the trolley 9 with respect to the ODV frame 1 while under load. The trolley is the point of attachment for the trailer mule hitch assembly frame 48.

Figure 8:
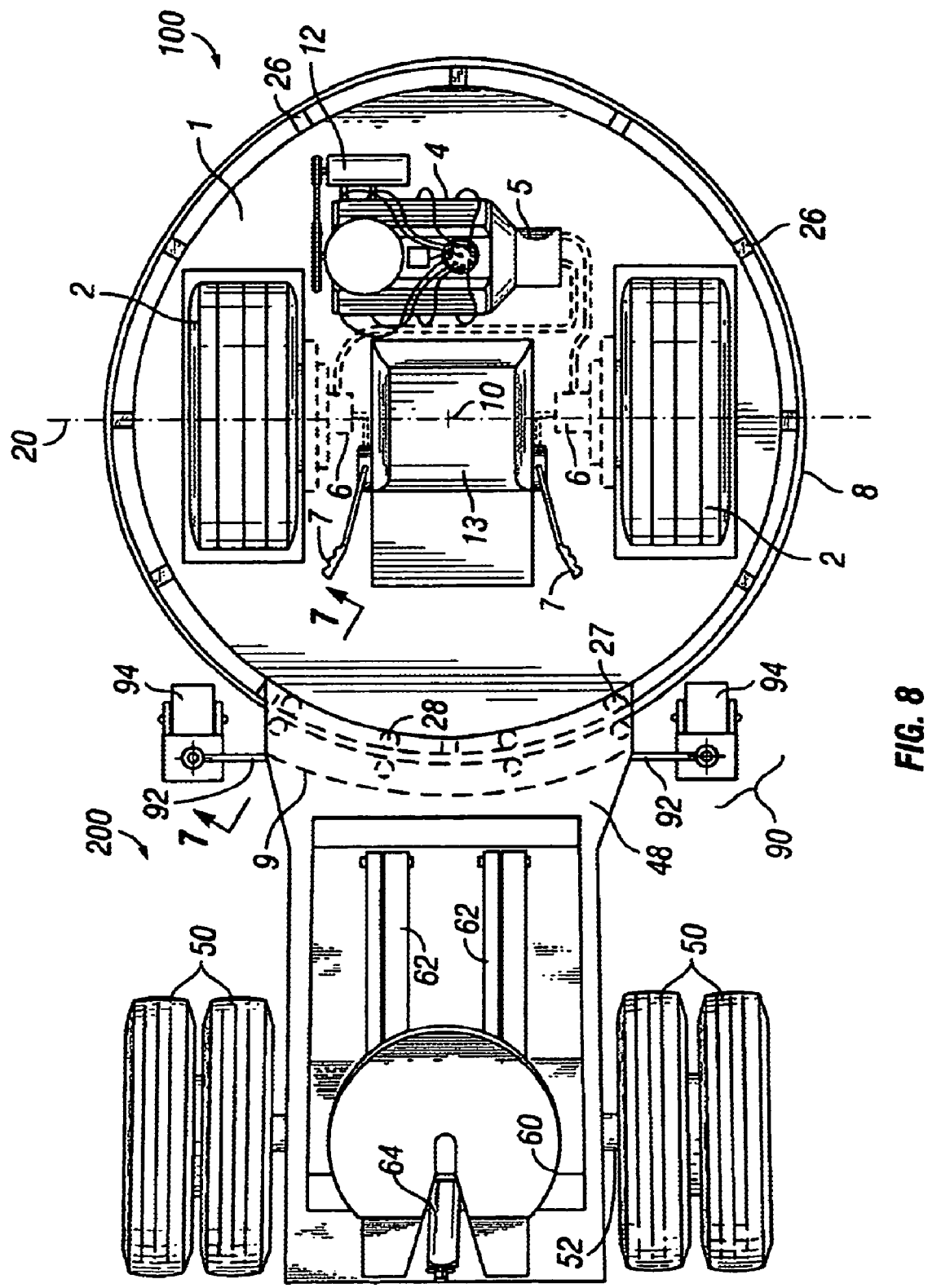
FIG. 8 is a top view of an alternative embodiment of the tractor mule vehicle according to the invention with the cab removed and showing outrigger wheels attached to the trolley assembly.

FIG. 8 shows an alternative embodiment of the trailer mule vehicle 150 wherein an optional support assembly 90 is mounted to the rotatable trolley assembly 9. The optional support assembly 90 has two outriggers 92 having distal ends supported by small wheels or swivel casters 94. The support assembly 90 allows the ODV 100 to maintain balance when the trailer mule hitch assembly 200 is removed.

While the preferred embodiments of the invention have been illustrated in detail, it is apparent that modifications and adaptations of the preferred embodiments will occur to those skilled in the art. Such modifications and adaptations are in the spirit and scope of the invention as set forth herein.

The invention claimed is:
1. A trailer mule vehicle (150) comprising,
an omni-directional vehicle (100), said omni-directional vehicle characterized by having first and second drive wheels (2) disposed along a horizontal axis (20) and designed and arranged to rotate 360 degrees about a central vertical axis (10) which intersects said horizontal axis between said first and second drive wheels, and
a hitch assembly (200) having an axle (52) with at least two trailer mule wheels (50) rotatably attached to said axle, and a trailer hitch (60, 66),
said hitch assembly (200) coupled to said omni-directional vehicle by a trolley assembly (9) designed and arranged so that said omni-directional vehicle (100) can rotate about said central vertical axis (10) while said hitch assembly (200) remains stationary.

2. A powered vehicle (150) comprising,
a frame (1) having a shape of a circular disk with a vertical axis (10) defined at the center of said circular disk,
first and second drive wheels (2) coupled to said frame, each of said drive wheels capable of powered rotation about a horizontal axis (20) disposed through said vertical axis, each of said drive wheels capable of forward and rearward rotation about said horizontal axis, control mechanism (7) arranged and designed to control the direction of rotation and the speed of said first and second drive wheels, a trolley (9) rotatably coupled to an outer perimeter of said frame, and a hitch assembly (200) coupled to said trolley, said hitch assembly including a hitch assembly frame (48), an axle (52), at least two wheels (50) rotatably coupled to said axle, and a fifth wheel plate (60) designed and arranged to mate with a semi-trailer and carried by said hitch assembly frame.

3. The vehicle of claim 2 further comprising, a circular rail (8) disposed about the outer perimeter of said frame, and said trolley (9) is rotatably mounted on said rail.

4. The vehicle of claim 2 further comprising an articulating arm (62) coupled between said fifth wheel plate (60) and said hitch assembly frame (48) said arm (62) designed and arranged to allow said fifth wheel plate to be raised and lowered, and an actuator (64) coupled between said fifth wheel plate (60) and said hitch assembly frame (48) and designed and arranged to raise and lower said fifth wheel plate (60).

5. The vehicle of claim 4 further comprising, an operator seat (13) mounted on said frame (1) at a position intersected by said vertical axis (10) and between said first and second drive wheels (2), wherein said fifth wheel plate is designed and arranged to be raised to a height and said operator seat is disposed at an elevation sufficient for an operator (400) seated in said operator seat and facing said raised fifth wheel plate has a generally horizontal line of sight (42) which passes underneath a trailer (300) which is hitched to said fifth wheel plate, said line of sight extending to the distal end of said trailer.

6. The vehicle of claim 2 further comprising an operator seat (13) mounted on said frame (1) at a position intersected by said vertical axis (10) and between said first and second drive wheels (2).

7. The vehicle of claim 6 further comprising a first control lever (7) positioned on a first side of said operator seat, said first control lever operatively coupled to a first power source (6) for controlling the speed and direction of rotation of a first drive wheel (2), and a second control lever (7) positioned on a second side of said operator seat, said second control lever operatively coupled to a second power source (6) for controlling the speed and direction of rotation of a second drive wheel (2), wherein each of said first and second drive wheels are controlled independently of each other.

8. The vehicle of claim 6 further comprising, a cab (80) coupled to said frame (1) and enclosing said seat (13).

9. The vehicle of claim 8 wherein, a front portion (82) of said cab (80) has an opening sized to allow an operator to pass through.

10. The vehicle of claim 2 further comprising a first outrigger (92) having near and distal ends, said near end of said first outrigger coupled to said hitch assembly frame (48) and said distal end of said first outrigger rotatably coupled to a first outrigger wheel (94), and a second outrigger (92) having near and distal ends, said near end of said second outrigger coupled to said hitch assembly frame (48) and said distal end of said second outrigger rotatably coupled to a second outrigger wheel (94).

11. The vehicle of claim 10 wherein, said first outrigger wheel (94) and said second outrigger wheel (94) are designed and arranged to swivel about first and second outrigger vertical axes, respectively.

12. The vehicle of claim 2 further comprising, a supply of air (12) fluidly coupled to an air hose (72) for coupling to said semi-trailer.

13. The vehicle of claim 12 further comprising, a fluid swivel coupled between said supply of air (12) and said air hose (72).

14. The vehicle of claim 2 further comprising, a pintle hitch (66).

15. A unitary vehicle (150) comprising:

an omni-directional cab (100) characterized by first and second drive wheels (2) disposed along a horizontal axis (20) and capable of independent powered rotation, said omni-directional cab capable of rotation about a central vertical axis (10); and a chassis (200) having an axle (52) with first and second wheels (50) rotatably attached to said axle, said chassis revolvably and non-removably coupled to said omni-directional cab.

* * * * *